June 11, 1940.  H. R. LEGATSKI  2,204,042
ABSORBENT COOLING SYSTEM
Filed Jan. 7, 1938
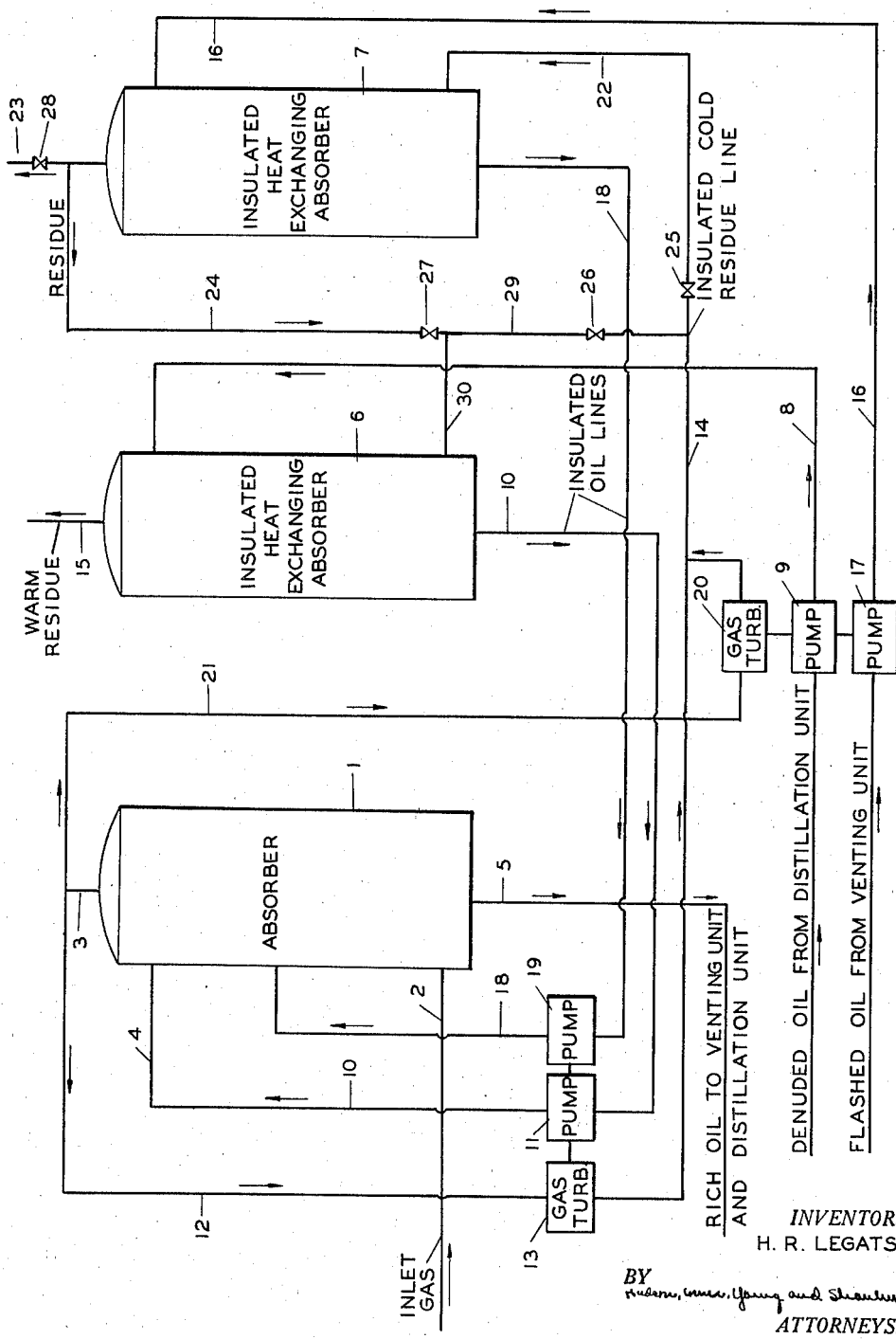
INVENTOR.
H. R. LEGATSKI
BY
ATTORNEYS.

Patented June 11, 1940

2,204,042

UNITED STATES PATENT OFFICE 2,204,042

ABSORBENT COOLING SYSTEM

Harold R. Legatski, Bartlesville, Okla., assignor to Phillips Petroleum Company, a corporation of Delaware Application January 7, 1938, Serial No. 183,921

8 Claims. (Cl. 62—175.5)

This invention relates to an improvement in processes for cooling an absorption medium.

In present practice the absorption oil is passed through the absorber to become enriched with the gas being treated. The enriched oil is stripped of the gas absorbed in vent tanks and distillation units. A distillation unit includes heat exchangers and atmospheric cooling coils for cooling the oil from the high still temperature down to near pond water temperature. It is well known that the cooler the absorbent when contacted with the gas to be treated, the greater is the amount of absorption. However there has always been an economic limit beyond which the cost of cooling the absorbent is not returned by the higher absorption efficiency. This was based on the fact that power was needed to supply the necessary refrigeration.

Recently the pressure used in absorption zones has been increased until at present relatively high pressures are common. Since the residue pressure in an absorption system is usually relatively low the pressure differential between the absorption zone gas discharge and the residue lines can be used to do work around the plant. In performing such work the gas is expanded and considerably cooled. In the applicant's system this cold gas can be passed in intimate contact relation to the denuded absorbent and if desired, a portion of the partially denuded absorbent thereby lowering the absorbent temperature and raising the absorption efficiency. At the same time some of the residue gas is absorbed in the absorbent, the heat generated by the absorption phenomena raising the temperature of the absorbent slightly above that which would result from the cooling action of the gas alone. However, when the cooled absorbent is admitted to the absorption zone some of the gases absorbed in the cooling zone may be liberated and cool the absorbent within the absorption zone. This might be the case despite the fact that the cooled absorbent would be passing to a higher pressure in the absorption zone because the partial pressures in the residue gas of the components dissolved in the cooled oil would be different than the partial pressures of these components in the gas entering the absorption zone. If the absorption zone pressure is quite high, the components absorbed in the cooling zone, which correspond to the lightest components in the gas passing through the absorption zone are nearer equilibrium with those in the gas and therefore less of these components are absorbed from the gas in this zone, resulting in a lower temperature rise due to absorption. Thus the same degree of refrigeration is accomplished while maintaining the absorbent in the pipe lines between the cooling zone and the absorption zone at a higher temperature. With this absorbent at a higher temperature there is less heat exchange in these lines.

An important object of the present invention is to provide a process for economically cooling an absorption medium.

A further important object of the present invention is to provide a process for cooling an absorption medium using normally wasted power.

A still further important object of the present invention is to provide a process for reducing the temperature rise in an absorption zone.

A still further important object of the present invention is to provide a process for cooling an absorption medium in a hydrocarbon recovery plant while at the same time recovering desirable hydrocarbons in the cooling zone.

Referring to the drawing accompanying this specification and forming part of the same, the figure is a diagrammatical showing of a system for carrying out the invention.

Reference numeral 1 designates a main absorber having a gas inlet at 2, a gas discharge line at 3, a denuded absorbent inlet pipe at 4 and a rich absorbent discharge pipe at 5 which goes to the vent tanks and distillation unit (not shown). The venting unit may consist of one or more vent tanks for flashing the lightest components, the flashed absorbent going to the distillation unit. The distillation or stripping unit comprises among other equipment heat exchangers and an atmospheric cooling section for cooling the hot lean absorbent from the still to about pond water temperature. As will be explained later some of the flashed absorbent may be recycled to the main absorber without going through the distillation unit. At 6 and 7 are shown two heat insulated units herein called heat exchanging absorbers because they may be constructed in the same manner as the usual low pressure absorption tower, and in them the cold gas is contacted with the absorption liquid to cool the latter. A pipe line 8 having a pump 9 connects the distillation unit and the top of heat exchanging absorber 6 and an insulated pipe line 10 having a pump 11 therein conducts the cooled absorbent from heat exchanging absorber 6 to the main absorber 1. Pipe 3 connects with a pipe line 12 for conducting the gaseous discharge of main absorber 1 to turbine or any other form of work machine 13. Turbine 13 in the embodiment shown acts as prime mover for pump 11. The exhaust from turbine 13 is conducted by insulated pipes 14, 29 and 30 to the base of heat exchanging absorber 6 from whence it goes to the residue line through pipe 15.

If a portion of the flashed absorbent is to be recycled to main absorber 1, pipe line 16 having pump 17 therein conducts the flashed absorbent to the top of heat exchanging absorber 7. The cooled absorbent from heat exchanging absorber 7 is conducted through insulated pipe 18 incorporating pump 19 to main absorber 1, in the illustrated embodiment, at an intermediate point. Pump 19 can, like pump 11, be driven by turbine 13. Pumps 9 and 17 in the absorbent lines can be driven from a turbine or other work machine 20 operated by expansion of the gaseous discharge of main absorber 1 conducted thereto by pipe line 21. The exhaust from turbine 20 is connected into pipe line 14 which has an insulated extension 22 to the base of heat exchanging absorber 7. The gaseous discharge from heat exchanging absorber 7 may be connected to residue lines through pipe 23 or it may be conducted through insulated pipe 24 to be passed in series through heat exchanging absorber 6 with pipe line 29 closed. Valves 25, 26, 27 and 28 are shown for controlling the disposition of the cold gas in pipe line 14 according to the desired alternative methods described.

In operating under the usual absorption system wherein as explained above the rich oil from the main absorber is sent to the distillation unit or to flash tanks and then to the distillation unit, the lean absorption liquid from the distillation unit is sent to heat exchanging absorber 6 through which it flows in intimate countercurrent contact with cold gas which has been discharged from absorber 1 and expanded in work machine 13. As a result the lean absorbent discharged from heat exchanging absorber 6 has been cooled and also contains in solution a certain amount of the components of the gas. If no absorption took place in the heat exchanging absorber the absorption liquid issuing therefrom would be at a lower temperature than when absorption takes place. However, the heat liberated due to absorption in unit 6 is thus not liberated in main absorber 1 because the absorption taking place at the latter point is less by the amount of components already in solution in the absorption liquid. The natural effect of this phenomenon is that the absorption liquid in pipe line 10 is at a relatively higher temperature than it would be if no absorption took place in unit 6. Therefore there is less heat exchange between pipe line 10 and its surroundings.

In cases where a portion of the flashed absorbent is to be recycled without distillation to the main absorber it can be conducted through pipe 16 to the top of heat exchanging absorber 7 where it is contacted with cold gas from pipe 14 through pipe 22. This gas is discharged from unit 7 either to the residue line through pipe 23 or is sent to unit 6. In the latter instance valve 26 in pipe line 29 is of course closed. It is usually advantageous to pass the cold gas through the heat exchanging absorbers in series since if any of the gasoline components in the flashed oil are stripped out of the flashed oil by the gas in unit 7, they will be recovered in unit 6.

I claim:

1. A process for treating hydrocarbon gas which is under pressure, comprising contacting said gas with an absorption medium in an absorption zone whereby the absorption medium is enriched with said gas, stripping the enriched absorption medium, expanding said gas to cool the same, contacting the stripped absorption medium with the cool gas, and recycling the absorption medium to said absorption zone.

2. A process for treating hydrocarbon gas which is under pressure, comprising contacting said gas with an absorption medium in an absorption zone whereby the absorption medium is enriched with said gas, denuding a portion of the enriched absorption medium, partially denuding another portion of said enriched absorption medium, expanding said gas whereby the same is cooled, causing the denuded and partially denuded absorption mediums to pass in heat exchanging relation with the cool gas, and recycling the cooled absorption mediums to said absorption zone.

3. A process for treating hydrocarbon gas which is under pressure comprising contacting said gas with an absorption medium in an absorption zone whereby the absorption medium is enriched with said gas, denuding a portion of the enriched absorption medium, partially denuding another portion of said enriched absorption medium, expanding said gas whereby the same is cooled, contacting the denuded and the partially denuded absorption mediums with the cooled gas, and recycling the cooled absorption mediums to said absorption zone.

4. A process for treating a hydrocarbon gas in which the gas is under pressure, comprising passing a stream of absorption liquid in countercurrent relation to a stream of said gas in an absorption zone whereby said absorption liquid is enriched with said gas, partially denuding a stream of the enriched liquid, denuding a second stream of the enriched liquid, passing a stream of the partially denuded absorption liquid through a first heat exchanging zone, passing a stream of said denuded absorption liquid through a second heat exchanging zone, expanding the gaseous residue of said absorption zone in a work machine, whereby its temperature is lowered, passing the expanded gas through said first and second heat exchanging zones series in countercurrent relation with said stream of partially denuded absorption liquid and said stream of denuded absorption liquid, and recycling said partially denuded absorption liquid and said denuded absorption liquid to said absorption zone.

5. A process for treating a hydrocarbon gas in which the gas is under pressure, comprising passing a stream of absorption liquid in countercurrent relation to a stream of said gas in an absorption zone whereby said absorption liquid is enriched with said gas, partially denuding a stream of the enriched liquid, denuding a second stream of the enriched liquid, passing a stream of the partially denuded absorption liquid through a first heat exchanging zone, passing a stream of the denuded absorption liquid through a second heat exchanging zone, expanding the gaseous residue of said absorption zone in a work machine, whereby its temperature is lowered, passing the expanded gas through said first and second heat exchanging zones in series in contact with said stream of partially denuded absorption liquid and said stream of denuded absorption liquid, and recycling said partially denuded absorption liquid and said denuded absorption liquid to said absorption zone.

6. A process for treating a hydrocarbon gas in which the gas is under pressure, comprising passing a stream of absorption liquid in countercurrent relation to a stream of said gas in an absorption zone whereby said absorption liquid is enriched with said gas, partially denuding a stream of the enriched liquid, denuding a second stream of the enriched liquid, passing a stream of the partially denuded absorption liquid through a first heat exchanging zone, passing a stream of the denuded absorption liquid through a second heat exchanging zone, expanding the gaseous residue of said absorption zone in a work machine, whereby its temperature is lowered, passing the expanded gas through said first and second heat exchanging zones in contact with said stream of partially denuded absorption liquid and said stream of denuded absorption liquid, and recycling said partially denuded absorption liquid and said denuded absorption liquid to said absorption zone.

7. A process for treating a hydrocarbon gas in which the gas is under pressure, comprising passing a stream of absorption liquid in countercurrent relation to a stream of said gas in an absorption zone whereby said absorption liquid is enriched with said gas, partially denuding a stream of the enriched liquid, denuding a second stream of the enriched liquid, passing a stream of the partially denuded absorption liquid through a first heat exchanging zone, passing a stream of the denuded absorption liquid through a second heat exchanging zone, expanding the gaseous residue of said absorption zone in a work machine, whereby its temperature is lowered, passing the expanded gas through said first and second heat exchanging zones in series in contact with said stream of partially denuded absorption liquid and said stream of denuded absorption liquid, and recycling said partially denuded absorption liquid and said denuded absorption liquid to said absorption zone.

8. A process for treating hydrocarbon gas in which the gas is under pressure comprising, contacting said gas with an absorption liquid in a first absorption zone, expanding the gaseous effluent of the first absorption zone whereby the same becomes cooled, contacting the cooled gaseous effluent of the absorption zone with an absorption liquid in a heat exchanging absorption zone, and passing the liquid effluent of the heat exchanging absorption zone to the first absorption zone as absorption liquid.

HAROLD R. LEGATSKI.